US010913876B2

United States Patent
Xie et al.

(10) Patent No.: US 10,913,876 B2
(45) Date of Patent: Feb. 9, 2021

(54) POLYUREA-POLY(METH)ACRYLATE INTERPENETRATING POLYMER NETWORK ADHESIVE COMPOSITIONS AND METHODS OF USING THE SAME

(71) Applicant: IPS Corporation, Compton, CA (US)

(72) Inventors: Xiaoyi Xie, Diamond Bar, CA (US); Andreas Schneider, Fullerton, CA (US)

(73) Assignee: IPS Corporation, Compton, CA (US)

( * ) Notice: Subject to any disclaimer, the term of this patent is extended or adjusted under 35 U.S.C. 154(b) by 95 days.

(21) Appl. No.: 16/303,421

(22) PCT Filed: May 24, 2017

(86) PCT No.: PCT/US2017/034125
§ 371 (c)(1),
(2) Date: Nov. 20, 2018

(87) PCT Pub. No.: WO2017/205445
PCT Pub. Date: Nov. 30, 2017

(65) Prior Publication Data
US 2019/0211229 A1    Jul. 11, 2019

Related U.S. Application Data

(60) Provisional application No. 62/342,557, filed on May 27, 2016.

(51) Int. Cl.
*C09J 4/06* (2006.01)
*C08K 5/55* (2006.01)
(Continued)

(52) U.S. Cl.
CPC ............ *C09J 4/06* (2013.01); *C08G 18/6208* (2013.01); *C08G 18/6225* (2013.01);
(Continued)

(58) Field of Classification Search
CPC .... C09J 133/08–12; C09J 175/02; C09J 4/00; C09J 4/06; C08G 18/69; C08G 18/696;
(Continued)

(56) References Cited

U.S. PATENT DOCUMENTS 5,486,024 A    1/1996  Dierdorf
5,616,796 A    4/1997  Pocius et al.
(Continued)

FOREIGN PATENT DOCUMENTS

EP    1656414    4/2013

OTHER PUBLICATIONS

Huntsman Corporation, Jeffamine D-2000 amine Technical Bulletin (2006).*
(Continued)

*Primary Examiner* — Kregg T Brooks
(74) *Attorney, Agent, or Firm* — Myers Bigel, P.A.

(57) ABSTRACT

Provided herein are adhesive compositions comprising a polyurea-poly(meth)acrylate interpenetrating polymer network. Further provided are two-part curable adhesive compositions comprising a Part A initiator composition and a Part B activator composition. The Part A initiator composition comprises an organoborane-amine complex and the Part B activator composition comprises an isocyanate that is reactive with the amine portion of the organoborane-amine complex to liberate organoborane from the organoborane-amine complex. Further provided are methods of using an adhesive composition comprising a polyurea-poly(meth)acrylate interpenetrating polymer network, such as, for example, in joining and/or bonding together polyolefin materials (e.g., polypropylene random copolymer (PP-R) pipes).

14 Claims, 1 Drawing Sheet

(51) Int. Cl.
*C08G 18/69* (2006.01)
*C08K 5/17* (2006.01)
*C08K 5/16* (2006.01)
*C08G 18/62* (2006.01)
*C08G 18/79* (2006.01)
*C09J 175/02* (2006.01)
*C08G 18/73* (2006.01)
*C09J 133/10* (2006.01)
*F16L 9/12* (2006.01)
*F16L 13/10* (2006.01)
*C08L 53/02* (2006.01)
*C08L 55/02* (2006.01)

(52) U.S. Cl.
CPC ........... *C08G 18/696* (2013.01); *C08G 18/73* (2013.01); *C08G 18/792* (2013.01); *C08K 5/16* (2013.01); *C08K 5/17* (2013.01); *C08K 5/55* (2013.01); *C09J 133/10* (2013.01); *C09J 175/02* (2013.01); *F16L 9/12* (2013.01); *F16L 13/103* (2013.01); *C08G 2270/00* (2013.01); *C08L 53/02* (2013.01); *C08L 55/02* (2013.01)

(58) Field of Classification Search
CPC ........ C08G 2270/00; C08K 5/16; C08K 5/55; C08L 75/02
See application file for complete search history.

(56) References Cited

U.S. PATENT DOCUMENTS

| | | | |
|---|---|---|---|
| 5,686,544 A | 11/1997 | Pocius | |
| 5,718,977 A | 2/1998 | Pocius | |
| 5,795,657 A | 8/1998 | Pocius et al. | |
| 5,935,711 A | 8/1999 | Pocius et al. | |
| 6,093,778 A | 7/2000 | Pocius | |
| 6,602,958 B2 | 8/2003 | Briggs et al. | |
| 6,710,145 B2 * | 3/2004 | Sonnenschein | C07F 5/027 502/162 |
| 7,341,285 B2 | 3/2008 | McPherson | |
| 7,510,623 B2 | 3/2009 | Lutz et al. | |
| 7,638,007 B2 | 12/2009 | Sehanobish et al. | |
| 8,276,636 B2 | 10/2012 | McPherson | |
| 8,647,716 B2 | 2/2014 | Gutowski et al. | |
| 8,742,050 B2 | 6/2014 | Wang et al. | |
| 9,018,326 B2 | 4/2015 | Xie | |
| 9,044,900 B2 | 6/2015 | McPherson | |
| 9,315,701 B2 | 4/2016 | Wang et al. | |
| 2003/0096916 A1 * | 5/2003 | Chao | C08G 18/6208 525/333.2 |
| 2004/0242812 A1 | 12/2004 | Sonnenschein et al. | |
| 2008/0103274 A1 * | 5/2008 | Jialanella | C08F 4/52 526/227 |
| 2009/0090454 A1 * | 4/2009 | Lutz | C09J 4/00 156/94 |
| 2009/0173441 A1 | 7/2009 | Lutz et al. | |
| 2010/0259040 A1 | 10/2010 | Kjolseth et al. | |
| 2013/0181436 A1 | 7/2013 | McPherson et al. | |
| 2013/0261247 A1 | 10/2013 | Briggs et al. | |
| 2014/0235793 A1 * | 8/2014 | Wang | C08G 18/6225 525/123 |
| 2015/0353587 A1 | 12/2015 | Garbe et al. | |

OTHER PUBLICATIONS

Huntsman "Jeffamine D-230 Polyetheramine" Technical Bulletin (2 pages) (2008).

International Search Report and the Written Opinion of the International Searching Authority corresponding to International Patent Application No. PCT/US2017/034125 (11 pages) (dated Aug. 29, 2017).

Extended European Search Report corresponding to European Patent Application No. 17803469.0 (10 pages) (dated Feb. 4, 2020).

BASF "Inorganic Specialties by BASF" (39 pages) Presentation dated Feb. 16, 2011.

Boros, Stephen "Long-Term Hydrostatic Strength and Design of Thermoplastic Piping Compounds" Journal of ASTM International, 8(9):1-11 (2011).

International Preliminary Report on Patentability corresponding to International Patent Application No. PCT/US2017/034125 (8 pages) (dated Nov. 27, 2018)

Sonnenschein et al. "Physical and Chemical Probes of the Bond Strength between Trialkylboranes and Amines and Their Utility as Stabilized Free Radical Polymerization Catalysts" Macromolecules, 39:2507-2513 (2006).

"Standard Test Method for Obtaining Hydrostatic Design Basis for Thermoplastic Pipe Materials or Pressure Design Basis for Thermoplastic Pipe Products" ASTM International, Designation: D 2837-04 (14 pages) (2004).

\* cited by examiner

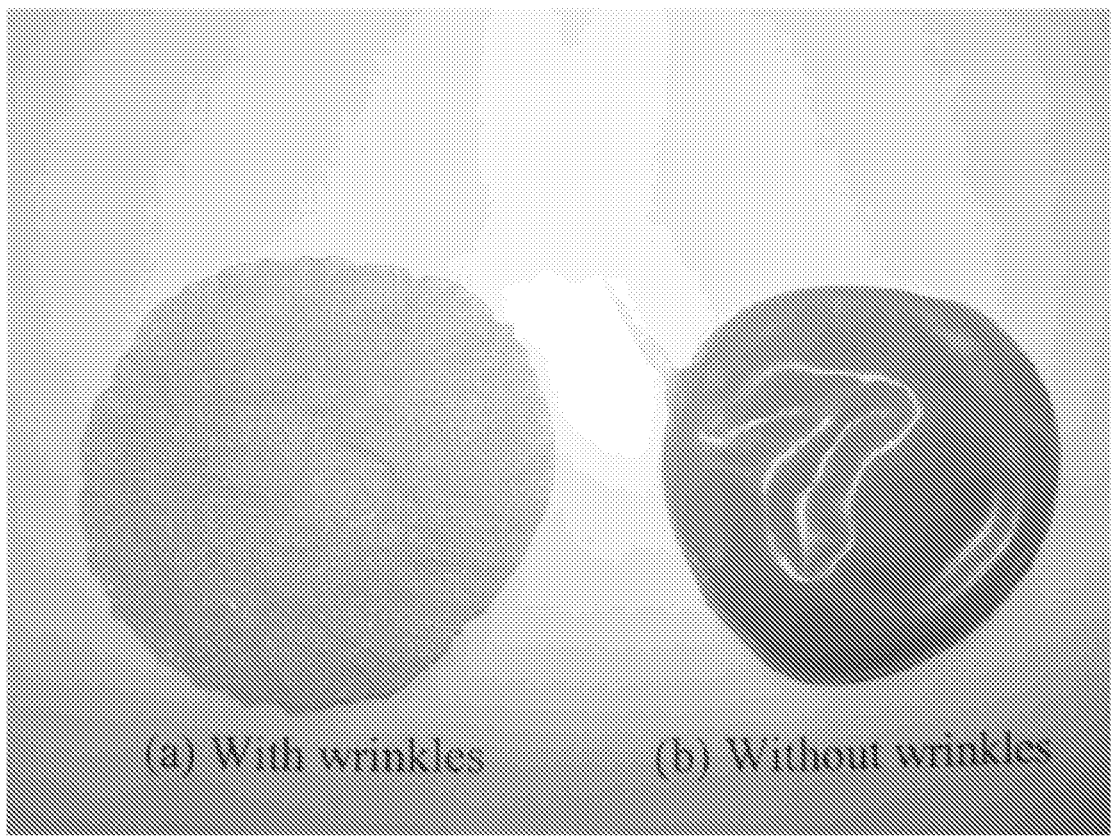

POLYUREA-POLY(METH)ACRYLATE INTERPENETRATING POLYMER NETWORK ADHESIVE COMPOSITIONS AND METHODS OF USING THE SAME

RELATED APPLICATIONS

This application claims the benefit of and priority to U.S. Provisional Application Ser. No. 62/342,557, filed May 27, 2016, the disclosure of which is hereby incorporated by reference herein in its entirety.

FIELD

The present invention relates generally to adhesive compositions comprising a polyurea-poly(meth)acrylate interpenetrating polymer network. The present invention further relates to adhesive systems, such as, for example, those including a two-part curable adhesive composition comprising a Part A initiator composition and a Part B activator composition, wherein the Part A initiator composition comprises an organoborane-amine complex and the Part B activator composition comprises an isocyanate that is reactive with the amine portion of the organoborane-amine complex to liberate the organoborane from the organoborane-amine complex. In addition, the present invention relates to a method of using an adhesive system and/or composition of the present invention, such as, for example, in joining and/or bonding polyolefin materials (e.g., polypropylene random copolymer (PP-R) pipes).

BACKGROUND (Meth)acrylic adhesives using trialkylborane-amine complex initiators have been found to provide exceptionally good adhesion to low surface energy polyolefin materials such as, e.g., polyethylene, polypropylene, and polytetrafluoroethylene (e.g., TEFLON). One specific area where low surface energy polyolefin materials of this type find utility is for plastic pipe joints where a mixed adhesive can be applied, such as, for example, by conventional means using a dauber, brush, swab, or other suitable applicator device. One specific application method is to inject the adhesive into a pipe joint using a mixing and dispensing device that is readily available and known to those of skill in the art such as, e.g., those disclosed in U.S. Pat. Nos. 5,486,024, 7,341,285, 8,276,636, and 9,044,900, and U.S. Patent Application Publication Nos. 2010/0259040 and 2013/0181436, each of which is incorporated by reference herein. In injection pipe joints, an adhesive is injected via a hole in the socket into a gap between a socket and an inserted pipe end and allowed to set after the socket and pipe end have been initially fitted together.

(Meth)acrylic adhesives have been found to have utility for bonding other types of pipe joint designs. However, problems can be associated with (meth)acrylic adhesives including organoborane-amine complex systems even though they may provide good bond strengths with polyolefin materials. Commercial (meth)acrylic adhesives of this type usually contain acids and the like, which readily react with amines to decomplex the organoborane-amine complex. These acid-containing adhesives have been found to have high hydrophilicity or have high water absorption rates. In addition, the cured adhesive tends to swell when immersed in water for a long period of time, which results in poor dimensional stability and is undesirable for pipe joining applications. Furthermore, for hot water supply systems, the performance of the adhesive at elevated temperatures is the crucial issue, and thermal stability of the adhesive is often a concern. In addition, (meth)acrylic adhesives tend to be brittle and have a strong tendency to shrink during polymerization. High polymerization shrinkage leads to poor adhesion, particularly when the adhesive is injected into an enclosed space in the injection pipe joints.

Also, some organoborane-amine systems are quite sensitive to polyolefin source, suggesting antioxidant types or amounts in the polyolefin may impact reactivity of the decomplexed organoborane with the polyolefin substrate. Recently, polypropylene random copolymer (PP-R) has been applied successfully for hot and cold water applications in countries worldwide. The combination of properties such as resistance to internal pressure, flexibility, and impact has made PP-R the material of choice for a safe and reliable long-lasting installation. However, some (meth)acrylic adhesives with organoborane amine systems have been found to provide poor adhesion to the pipe grade PP-R substrates.

It would be desirable, particularly in the plumbing arts, to obtain adhesives that have strong bond strength to polyolefin materials such as those used for bonding pipe joints within a reasonable cure time. In addition, there remains a need in the art for adhesive compositions having desirable storage stability, high strength, heat and moisture resistance properties, and having low polymerization shrinkage to maintain good dimensional stability. Thus, in plumbing applications, the ideal adhesive would have high elasticity, would not tend to embrittlement, would have a high water resistance, a heat resistance, and would be able to withstand continuous loading with hot water without significant swelling and joint failures.

SUMMARY OF EXAMPLE EMBODIMENTS

Aspects of the present invention relate to a polyurea-poly(meth)acrylate interpenetrating polymer network, and the use thereof in adhesive compositions, such as, e.g., structural adhesives.

One aspect of the present invention relates to a polyurea-poly(meth)acrylate interpenetrating polymer network adhesive composition comprising a crosslinked polyurea and a crosslinked poly(meth)acrylate, wherein the two crosslinked polymer networks interpenetrate each other during polymerization. The adhesive produced from a polyurea-poly(meth)acrylate interpenetrating polymer network adhesive composition of the present invention may be resistant to heat and/or moisture and/or may be suitable for joining polyolefin materials, particularly, polypropylene random copolymer (PP-R) materials (e.g., PP-R pipes).

Another aspect of the present invention relates to an adhesive system. In some embodiments, the adhesive system may comprise a two-part curable adhesive composition that includes a first part and a second part. In some embodiments, the two-part curable adhesive composition comprises a Part A initiator composition and a Part B activator composition, wherein the Part A initiator composition comprises an organoborane-amine complex and the Part B activator composition comprises an isocyanate that is reactive with the amine portion of the organoborane-amine complex to liberate organoborane from the organoborane-amine complex. In some embodiments, a polyurea-poly(meth)acrylate interpenetrating polymer network may be formed from a two-part curable adhesive composition comprising a Part A initiator composition and a Part B activator composition.

A further aspect of the present invention relates to a two-part curable adhesive composition comprising a Part A initiator composition and a Part B activator composition, wherein the Part A initiator composition comprises an organoborane-amine complex and at least one amine terminated liquid polymer, and the Part A initiator composition contains no free radically polymerizable monomers; and the Part B activator composition comprises at least one isocyanate, at least one free radically polymerizable monomer, and at least one compound having at least two free radically polymerizable ethylenically unsaturated groups. In some embodiments, the mixing ratio of Part A to Part B is about 1:4 to about 1:20.

Another aspect of the present invention relates to a method of joining and/or bonding a first object and second object (e.g., polyolefin pipes, such as PP-R pipes) comprising: applying a two-part curable adhesive composition comprising a Part A initiator composition and a Part B activator composition to at least one surface of the first object and/or second object; and curing the two-part curable adhesive composition to join and/or bond the first object and second object together. In some embodiments, the two-part curable adhesive composition is combined (e.g., mixed) prior to applying the two-part curable adhesive composition to the at least one surface of the first object and/or second object. In some embodiments, the Part A initiator composition contains no free radically polymerizable monomers and the Part A initiator composition comprises an organoborane-amine complex and at least one amine terminated liquid polymer; and the Part B activator composition comprises at least one isocyanate, at least one free radically polymerizable monomer, and at least one compound having at least two free radically polymerizable ethylenically unsaturated groups.

Another aspect of the present invention relates to a method of forming a pipe joint comprising a pipe and fitting (referred to in the trade as the spigot end) bonded by a cured adhesive, the method comprising mixing a two-part curable adhesive composition comprising a Part A initiator composition and a Part B activator composition, wherein the Part A initiator composition contains no free radically polymerizable monomers and comprises an organoborane-amine complex and at least one amine terminated liquid polymer, and the Part B activator composition comprises at least one polyisocyanate, at least one free radically polymerizable monomer, and at least one compound having at least two free radically polymerizable ethylenically unsaturated groups; applying the mixed two-part curable adhesive composition to at least one surface of one of the pipe and fitting; and curing the mixed two-part curable adhesive composition to form the cured adhesive that bonds the pipe and fitting. In some embodiments, at least one of the pipe and fitting is formed of a polyolefin (e.g., PP-R).

A further aspect of the present invention relates to a pipe joint comprising a pipe and fitting bonded together by a cured adhesive, wherein at least one of the pipe and fitting comprises a polyolefin (e.g., PP-R) and the cured adhesive is a cured product formed from combining a Part A initiator composition and a Part B activator composition, wherein the Part A initiator composition contains no free radically polymerizable monomers, the Part A initiator composition comprises an organoborane-amine complex and at least one amine terminated liquid polymer, and the Part B activator composition comprises at least one isocyanate, at least one free radically polymerizable monomer, and at least one compound having at least two free radically polymerizable ethylenically unsaturated groups. In some embodiments, the pipe and/or fitting and/or at least one surface thereof is formed of a polyolefin (e.g., PP-R).

The foregoing and other aspects of the present invention will now be described in more detail including other embodiments described herein.

BRIEF DESCRIPTION OF THE FIGURES

The foregoing and other objects, features and advantages of the invention will become more apparent from the following more particular description of exemplary embodiments of the invention and the accompanying drawings. The drawings are not necessarily to scale, emphasis instead being placed upon illustrating the principles of the invention.

FIG. 1 is a photograph of a cured adhesive (a) with wrinkles and (b) without wrinkles.

DETAILED DESCRIPTION OF EXAMPLE EMBODIMENTS

The present invention will now be described more fully hereinafter. This invention may, however, be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. All publications, patent applications, patents and other references mentioned herein are incorporated by reference in their entirety. In case of a conflict in terminology, the present specification is controlling.

Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed.

As used herein, the transitional phrase "consisting essentially of" (and grammatical variants) is to be interpreted as encompassing the recited materials or steps "and those that do not materially affect the basic and novel characteristic(s)" of the claimed invention. See, In re Herz, 537 F.2d 549, 551-52, 190 U.S.P.Q. 461, 463 (CCPA 1976) (emphasis in the original); see also MPEP § 2111.03. Thus, the term "consisting essentially of" as used herein should not be interpreted as equivalent to "comprising."

The term "about," as used herein when referring to a measurable value such as an amount or concentration and the like, is meant to encompass variations of ±10%, ±5%, ±1%, ±0.5%, or even 0.1% of the specified value as well as the specified value. For example, "about X" where X is the measurable value, is meant to include X as well as variations of ±10%, ±5%, ±1%, ±0.5%, or even ±0.1% of X. A range provided herein for a measureable value may include any other range and/or individual value therein.

As used herein, "(meth)acryl" is a shorthand term referring to "acryl" and/or "methacryl." For example, a "(meth)acryloxy" group is a shorthand term referring to either an acryloxy group (i.e., $CH_2=CHC(O)O-$) and/or a methacryloxy group (i.e., $CH_2=C(CH_3)C(O)O-$).

According to aspects of the present invention, provided are adhesive compositions comprising a polyurea-poly(meth)acrylate interpenetrating polymer network. A polyurea-poly(meth)acrylate interpenetrating polymer network adhesive composition of the present invention may comprise a crosslinked polyurea and a crosslinked poly(meth)acrylate, wherein the two crosslinked polymer networks interpenetrate each other during polymerization. "Interpenetrating polymer network" as used herein refers to a network of at least two crosslinked polymers wherein the at least two crosslinked polymer networks interpenetrate each other during polymerization. In some embodiments, an "interpenetrating polymer network" refers to a polymer comprising two or more networks that are at least partially interlaced on a molecular scale but not covalently bonded to each other and cannot be separated unless chemical bonds are broken.

Various current commercial adhesives may possess one or more desirable properties, but may lack one or more other desirable properties. For example, two-part reactive acrylic-based adhesives containing polymers such as poly(methyl methacrylate) and a monomer such as methyl methacrylate are generally considered to be strong with high modulus or rigidity, but tend to be somewhat brittle. Two-part reactive polyurea/urethane adhesives containing an isocyanate-terminated polyol and hardener of polyol or amine are generally considered to be flexible and elastic, but suffer from sensitivity to moisture and humidity. In general, elasticity, toughness and flexibility are beneficial when adhesive bonds are subjected to peeling or impact forces. However, many current adhesives often fail to retain these properties over a long period of time or when heated to elevated temperatures. The inventors of the present invention discovered that acrylic-based adhesives can be modified through the use of techniques involving the formation of an interpenetrating polymer network (IPN). In some embodiments, an adhesive composition of the present invention may comprise a fully cross-linked polyurea-poly(meth)acrylate IPN including a glassy poly(meth)acrylate network and an elastomeric polyurea network that results in a molecular composite with poly(meth)acrylate as the stiff phase and polyurea as the tough phase, which may enhance the fracture toughness of poly(meth)acrylate. The inventors of the present invention discovered that, in some embodiments, a suitable range for the weight percentage of the polyurea (e.g., cross-linked polyurea) (tough phase) in the adhesive composition of the present invention may be in a range of about 2% to about 20% by weight of the adhesive composition. In some embodiments, a high percentage of polyurea in the adhesive composition should be avoided since the rapid reaction between isocyanate and amine may cause the adhesive to gel too quickly, which may prevent the formation of a strong bond with the substrate. In addition, an excess amount of polyurea in the adhesive composition may result in a soft adhesive, which may reduce the bond strength. The inventors of the present invention further discovered that adhesive compositions of the present invention may be suitable for joining polyolefin materials, such as, for example, polypropylene random copolymer (PP-R) pipes.

According to some embodiments, provided is an adhesive system and/or kit. In some embodiments, an adhesive system and/or kit may comprise a two-part curable adhesive composition. The two-part curable adhesive composition may comprise a first part and a second part. In some embodiments, an adhesive system and/or kit of the present invention may separately store the first part and the second part, such as, for example, until the time of application and/or use. The system and/or kit may be configured to combine, contact, and/or mix the first part and second part, such as, for example, upon application to an object.

In some embodiments, an adhesive composition of the present invention may be a two-part curable adhesive composition. In some embodiments, the two-part curable adhesive composition may comprise a first part and/or composition comprising an initiator and a second part and/or composition comprising an activator. The two-part curable adhesive composition may comprise, consist essentially of, or consist of a Part A initiator composition and a Part B activator composition. The Part A initiator composition may comprise an organoborane-amine complex and at least one amine terminated liquid polymer. The Part B activator composition may comprise at least one isocyanate (e.g., a polyisocyanate), at least one free radically polymerizable monomer, and at least one compound having at least two free radically polymerizable ethylenically unsaturated groups. "Polyisocyante" as used herein refers to a compound comprising at least two isocyanate groups. "Free radically polymerizable monomer" as used herein refers to a monomer that is polymerizable using and/or via free radical polymerization. "Free radically polymerizable ethylenically unsaturated group" and grammatical variations thereof as used herein refer to a functional group comprising an ethylenically unsaturated group that is polymerizable using and/or via free radical polymerization.

Upon combination and/or mixing (e.g., by stirring, shaking, blending, and/or the like) of the Part A composition and Part B composition, a polyurea-poly(meth)acrylate interpenetrating polymer network may be formed simultaneously by two polymerization mechanisms: step polymerization and chain polymerization. In some embodiments, a polyurea-poly(meth)acrylate interpenetrating polymer network may be formed by at least a portion of the step polymerization and the chain polymerization occurring simultaneously. In some embodiments, an adhesive composition of the present invention may comprise a "simultaneous interpenetrating polymer network", which refers to an interpenetrating polymer network prepared by a process in which the component networks (e.g., crosslinked polyurea and crosslinked poly(meth)acrylate) are formed concurrently.

In some embodiments, the step polymerization occurs when an isocyanate (e.g., a multifunctional isocyanate and/or polyisocyanate) in Part B reacts with an amine (e.g., a multifunctional amine and/or an amine terminated liquid polymer) in Part A to form crosslinked polyurea. In some embodiments, the chain polymerization occurs when an isocyanate (e.g., a multifunctional isocyanate and/or polyisocyanate) in Part B reacts with the amine portion of the organoborane-amine complex in Part A to liberate the organoborane from the organoborane-amine complex, which then initiates free radical polymerization of free radically polymerizable monomers (e.g., (meth)acrylic monomers) in Part B and crosslinkers (e.g., a compound having at least two free radically polymerizable ethylenically unsaturated groups) to form crosslinked poly(meth)acrylate. The two crosslinked polymer networks may interpenetrate each other during polymerization.

In some embodiments, a Part A initiator composition of a two-part adhesive composition of the present invention (also referred to herein as "Part A") suitably includes at least one organoborane-amine complex and at least one amine terminated liquid polymer, and contains no free radically polymerizable monomers. Thus, in some embodiments, the Part A initiator composition does not contain free radically polymerizable monomers. Accordingly, free radically polymerizable monomers may be absent in Part A of the two-part adhesive composition.

In some embodiments, a Part B activator composition of a two-part adhesive composition of the present invention (also referred to herein as "Part B") suitably includes at least one isocyanate (e.g., polyisocyanate), at least one free radically polymerizable monomer, and at least one compound having at least two free radically polymerizable ethylenically unsaturated groups.

At least one initiator is included in a Part A initiator composition of the present invention. In some embodiments, one or more initiators (e.g., 1, 2, 3, or more) may be present in Part A. In some embodiments, the at least one initiator is an organoborane. The organoborane may be included in Part A in a stable organoborane-amine complex due to the pyrophoric nature of organoboranes. An "organoborane-amine complex" as used herein refers to a complex between an organoborane initiator and an amine. The amine may act as a blocking agent and may render the organoborane-amine complex stable at ambient conditions. In some embodiments, the organoborane-amine complex has the following general structure:

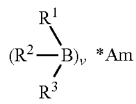

wherein $R^1$, $R^2$ and $R^3$ are each independently selected from alkyl groups having 1 to 10 carbon atoms, and Am is an amine. The value of v may be selected so as to provide an effective ratio of amine nitrogen atoms to boron atoms in the complex. The ratio of amine nitrogen atoms to boron atoms in the complex may be from about 0.5:1 to about 4:1. In some embodiments, the amine nitrogen atom to boron atom ratio may be about 1:1 to about 4:1 or about 1:1 to about 2:1. In some embodiments, the amine nitrogen atom to boron atom ratio may be about 1:1. The ratio of amine nitrogen atoms to boron atoms may change depending on a variety of factors including if both primary and secondary amine groups are present in the complex.

"Alkyl" or "alkyl group," as used herein, means a straight-chain (i.e., unbranched), branched, or cyclic hydrocarbon chain that is completely saturated. In some embodiments, alkyl groups contain 1, 2, 3, 4, 5, 6, 7, 8, 9, or 10 carbon atoms (e.g., $C_{1-4}$, $C_{2-4}$, $C_{3-4}$, $C_{1-5}$, $C_{2-5}$, $C_{3-5}$, $C_{1-6}$, $C_{2-6}$, $C_{3-6}$, $C_{2-7}$, $C_{1-10}$, $C_{4-8}$, etc.). In some embodiments, the term "alkyl" or "alkyl group" refers to a cycloalkyl group, also known as carbocycle. Non-limiting examples of exemplary alkyl groups include methyl, ethyl, propyl, isopropyl, butyl, cyclopropyl, and cyclohexyl.

In some embodiments, $R^1$, $R^2$, and $R^3$ are each independently an alkyl group having 1 to 5 carbon atoms such as methyl, ethyl, propyl, isopropyl, n-butyl, isobutyl, and pentyl. In some embodiments, $R^1$, $R^2$, and $R^3$ are the same. In some embodiments, $R^1$, $R^2$, and $R^3$ are n-butyl groups.

The amine (Am) may be a primary or secondary amine. In some embodiments, the amine is a monoamine. In some embodiments, the amine is a polyamine. Example amines for the amine portion (Am) of the organoborane-amine complex, include, but are not limited to, monoamines and polyamines. Example monoamines include, but are not limited to, ammonia, ethylamine, propylamine, butylamine, heptylamine, hexylamine, octylamine, benzylamine, methoxypropylamine, 2-methyl amino ethanol, cysteamine, and combinations thereof. Example alkane diamines include, but are not limited to, 1,2-ethanediamine, 1,3-propanediamine, 1,5-pentanediamine, 1,6-hexanediamine, 1,12-dodecanediamine, 2-methyl-1,5-pentane diamine, 3-methyl-1,5-pentane diamine, and/or isomers of these materials. Other alkyl polyamines that may be used for the amine portion of the organoborane-amine complex include, but are not limited to, triethylene tetraamine and/or diethylene triamine.

Example organoborane-amine complexes include, but are not limited to, those described in U.S. Pat. Nos. 8,647,716 and 6,710,145, the contents of each of which are incorporated herein by reference in their entirety. In some embodiments, the organoborane-amine complex is selected from the group of tri-n-butylborane diaminopropane (TnBB-DAP), tri-n-butylborane methoxypropylamine (TnBB-MOPA), triethylborane diaminopropane (TEB-DAP), tri-sec-butylborane diaminopropane (TsBB-DAP), triethylborane methoxypropylamine (TEB-MOPA), tri-sec-butylborane methoxypropylamine (TsBB-MOPA), and combinations thereof.

In some embodiments, the organoborane amine-complex may be a monoamine functional organoborane-amine complex, which may be used to avoid too rapid crosslinking reactions and consequently poor adhesion. Examples include, but are not limited to, TEB-MOPA, TnBB-MOPA, TsBB-MOPA, and combinations thereof. In some embodiments, the organoborane amine complex is tri-n-butylborane methoxypropylamine (TnBB-MOPA).

The organoborane-amine complex may be employed in an effective amount, which is an amount large enough and/or sufficient to permit polymerization to readily occur to obtain a high molecular weight polymer for the desired end use. If the amount of the organoborane-amine complex is too low, then the polymerization may be incomplete and the resulting adhesive may have poor adhesion. On the other hand, if the amount of the organoborane-amine complex is too high, then the polymerization may proceed too rapidly to allow for effective mixing and/or use of the resulting composition. In some embodiments, an organoborane-amine complex may be present in an amount of up to about 55 percent by weight, based on the total weight of the Part A initiator composition, such as, for example, about 1% to about 25%, about 25% to about 50%, or about 30% to about 45% by weight, based on the total weight of the Part A initiator composition. In some embodiments, the adhesive composition may comprise an organoborane-amine complex in an amount of about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, or 55% by weight, based on the total weight of the Part A initiator composition.

At least one amine terminated liquid polymer may be included in the Part A initiator composition. In some embodiments, one or more amine terminated liquid polymer(s) (e.g., 1, 2, 3, or more) may be present in Part A. In some embodiments, the at least one amine terminated liquid polymer may be a difunctional amine-terminated polymer, which may be used to form a crosslinked polyurea network. In some embodiments, the difunctional amine-terminated polymer may have a high molecular weight, but may remain in liquid form, which may avoid use of a non-reactive solvent and/or plasticizer in Part A and/or the adhesive composition. The use of solvent and/or plasticizer in the adhesive composition may cause poor heat stability (i.e., low bond strength at high temperatures). In some embodiments, an amine terminated liquid polymer may have a molecular weight in a range of about 1,000 Da to about 10,000 Da.

Glycol based polymers such as polyethylene glycols, polypropylene glycols and/or their amine-terminated derivatives may be added by reacting with isocyanate to form polyurethanes or polyureas. Detailed descriptions are disclosed in U.S. Pat. Nos. 5,616,796, 5,686,544, and 8,742,050. The glycol based polymers tend to be hydrophilic inherently and have high water absorption which is not desirable. On the other hand, polybutadiene polymers, which are hydrophobic, may withstand continuous loading with water without significant swelling, have high elasticity, and do not tend to embrittlement, are highly desirable.

In some embodiments, the at least one amine terminated liquid polymer is an amine-end-functionalized polybutadiene or polybutadiene-acrylonitrile, each of which may be a polymer or oligomer. Examples of amine-end-functionalized polybutadiene and polybutadiene-acrylonitrile include, but are not limited to, those that are commercially available from CVC Thermoset Specialties, Moorestown, N.J., under the designation of Hypro™ Reactive Liquid Polymers, for example, Hypro™ ATB (amine-terminated polybutadiene) and Hypro™ ATBN (amine-terminated polybutadiene-acrylonitrile). Further examples include, but are not limited to, Hypro™ 2000X173 ATB, Hypro™ 1300 X21 ATBN, Hypro™ 1300 X16 ATBN, Hypro™ 1300X35 ATBN, Hypro™ 1300X42 ATBN and Hypro™ 1300X45 ATBN. In some embodiments, Part A comprises Hypro™ 2000X173 ATB.

In some embodiments, at least one amine terminated liquid polymer may be present in an amount of up to about 70 percent by weight, based on the total weight of the Part A composition, such as, for example, about 1% to about 25%, about 30% to about 50%, about 25% to about 70%, or about 10% to about 45% by weight, based on the total weight of the Part A composition. In some embodiments, the adhesive composition may comprise an amine terminated liquid polymer in an amount of about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, or 70% by weight, based on the total weight of the Part A composition.

At least one activator is included in a Part B activator composition of the present composition. In some embodiments, one or more activators (e.g., 1, 2, 3, or more) may be present in Part B. In some embodiments, the at least one activator is an amine acceptor that readily reacts with an amine in the organoborane-amine complex to decomplex the organoborane-amine complex. Any suitable compound capable of decomplexing the organoborane-amine complex may be employed in Part B of an adhesive composition of the present invention.

Examples of suitable classes of activators include, but are not limited to, Bronsted and/or Lewis acids, isocyanates, aromatic aldehydes, acid chlorides, and the like that are capable of decomplexing the organoborane-amine complex. See Sonnenschein et al., "Physical and Chemical Probes of the Bond Strength between Trialkylboranes and Amines and Their Utility as Stabilized Free Radical Polymerization Catalysts", Macromolecules, 39, 2507-2513 (2006), the entire contents of which is incorporated by reference herein. See also U.S. Pat. No. 5,718,977, the entire contents of which is incorporated by reference herein.

An activator in Part B may liberate the organoborane in the organoborane-amine complex by reacting with the amine in the organoborane-amine complex. In some embodiments, the activator in Part B may be a compound and/or material that can readily form reaction products with amines at or below room temperature (e.g., at about 20° C. to about 25° C. or at about 23° C. or less). In some embodiments, the activator in Part B is an isocyanate, such as, for example, a polyisocyanate.

In some embodiments, the polyisocyanate in Part B may be used to form the polyurea network of the present invention, and may be represented by the formula Q(NCO)$_t$, wherein t may be 2-4, and Q may be aliphatic, alicyclic, aromatic, or combination of any of these groups, such as, e.g., aliphatic-aromatic group, aliphatic-alicyclic group, and the like. In some embodiments, the polyisocyanate is aliphatic. In some embodiments, Q contains 3-50 carbon atoms, and, in some embodiments, 4-24 carbon atoms.

"Aliphatic" as used herein alone or in combination with another term refers to an acyclic or cyclic, saturated or unsaturated carbon compound and/or functional group that is not aromatic. "Alicyclic" as used herein alone or in combination with another term refers to an aliphatic compound and/or functional group that is cyclic. "Aliphatic-aromatic" as used herein alone or in combination with another term refers to a compound and/or functional group having an aliphatic portion and an aromatic portion. "Aliphatic-alicyclic" as used herein alone or in combination with another term refers to a compound and/or functional group having an aliphatic portion and an alicyclic portion.

Further examples of isocyanates include, but are not limited to, tetramethylene diisocyanate; hexamethylene diisocyanate; trimethylhexamethylene diisocyanate; isophorone diisocyanate; dimethylbenzene diisocyanate; diethylbenzene diisocyanate; decamethylene 1,10-diisocyanate; cyclohexylene 1,2-diisocyanate; cyclohexylene 1,4-diisocyanate; 4,4'-diphenylmethane diisocyanate; toluene diisocyanate; 4,4'-methylene bis(cyclohexyl-isocyanate); neopentyl tetraisocyanate; m-xylylene diisocyanate; bis-(4-isocyanatophenyl) methane; 4,4',4"-triisocyanatotriphenylmethane, 1,3,5-triisocyanato-benzene, 2,4,6-triisocyanato-toluene and/or the like. Example polyisocyanates may include oligomeric polyisocyanates including, but not limited to, dimers, such as, e.g., the uretdione of 1,6-hexamethylene diisocyanate, trimers, such as, e.g., the biuret and isocyanurate of 1,6-hexanediisocyanate and the isocyanurate of isophorone diisocyanate, and polymeric oligomers. Suitable materials include, but are not limited to, those that are available from Bayer Corporation, Pittsburgh, Pa., under the designation Desmodur® including Desmodur® N100, N3200, N3300, N3400, N3600, XP2410 and/or XP2580. In some embodiments, Part B and/or an adhesive composition of the present invention comprises the trifunctional isocyanate Desmodur® N3300. Desmodur® N3300 has the following structure:

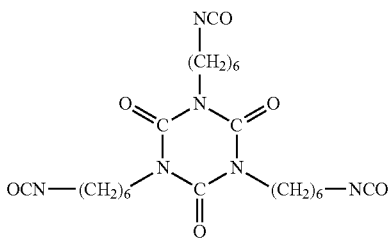

The amount of isocyanate (e.g., polyisocyanate) present in Part B and/or the adhesive composition may be chosen to be substantially equal to the number of equivalents of amine present in Part A and/or the adhesive composition. In some embodiments, the amount of isocyanate may be slightly greater than the number of equivalents of amine. In some embodiment, an isocyanate (e.g., a polyisocyanate) may be present in an amount of up to about 20 percent by weight, based on the total weight of the Part B composition, such as, for example, about 1% to about 10% or about 3% to about 15% by weight, based on the total weight of the Part B composition. In some embodiments, the adhesive composition may comprise an isocyanate in an amount of about 1%, 2%, 3%, 4%, 5%, 6%, 7%, 8%, 9%, 10%, 11%, 12%, 13%, 14%, 15%, 16%, 17%, 18%, 19%, or 20% by weight, based on the total weight of the Part B composition.

In some embodiments, the reaction of the isocyanate in Part B with the amine in the organoborane-amine complex in Part A is spontaneous upon combination, and thus no catalyst is needed for polyurea formation. Moreover, the reaction may be exothermic. The heat generated from the amine-isocyanate reaction may accelerate the free radical initiated polymerization of the acrylate, the other network of the interpenetrating network polymer of the present invention.

A two-part curable adhesive composition of the present invention may comprise at least one polymerizable compound that contains olefinic unsaturation and which can polymerize by free radical polymerization and includes those that are monomeric, oligomeric, or polymeric in nature, as well as mixtures thereof. In some embodiments, the at least one polymerizable compound may be present in Part B of the two-part adhesive composition.

In some embodiments, the at least one polymerizable compound may be a free radically polymerizable monomer, such as, for example, an ethylenically unsaturated vinyl monomer. A non-limiting example of an ethylenically unsaturated vinyl monomer includes a (meth)acrylic monomer including (meth)acrylates, substituted derivates thereof, such as amide, cyano, chloro, and/or silane derivatives thereof, and/or comonomers thereof.

Examples of suitable (meth)acrylates include, but are not limited to, methyl (meth)acrylate, ethyl (meth)acrylate, butyl (meth)acrylate, tert-butyl (meth)acrylate, cyclohexyl (meth)acrylate, 2-ethylhexyl (meth)acrylate, tetrahydrofurfuryl (meth)acrylate, isobornyl (meth)acrylate, and blends thereof. In some embodiments, the (meth)acrylate monomer is methyl methacrylate.

Urethane-acrylate oligomers may be included in Part B of the two-part adhesive composition of the present invention. In some embodiments, these reactive oligomers are added to the composition to provide flexibility and toughness to the cured adhesive.

In some embodiments, Part B may comprise at least one compound having at least two free radically polymerizable ethylenically unsaturated groups. These multifunctional monomers may serve as crosslinkers, along with other free radically polymerizable monomers, to form a polymer network initiated by the liberated organoborane through free radical chain polymerization mechanism. Crosslinked polymers may enhance the performance of the adhesive composition, such as, e.g., heat resistance of the cured adhesive. In some embodiments, a crosslinker may have a molecular weight in a range of about 150 Da to about 500 Da.

Examples of suitable compounds having at least two free radically polymerizable ethylenically unsaturated groups include, but are not limited to, multifunctional (meth)acrylate monomers, such as, but not limited to, di- or trifunctional (meth)acrylates like hexanediol di(meth)acrylate, trimethylol propane tri(meth)acrylate (TMPTMA), polyethylene glycol di(meth)acrylates, ethylene glycol dimethacrylate (EGDMA), diethylene glycol dimethacrylate, triethylene glycol dimethacrylate (TEGDMA), tetraethylene glycol di(meth)acrylate, dipropylene glycol dimethacrylate, di(pentamethylene glycol) dimethacrylate, diglycerol tetramethacrylate, tetramethylene dimethacrylate, ethylene dimethacrylate, neopentyl glycol diacrylate, trimethylol propane triacrylate and bisphenol-A di(meth)acrylates, such as ethoxylated bisphenol-A di(meth)acrylate (EBPADMA), bisphenol-F di(meth)acrylates, such as ethoxylated bisphenol-F di(meth)acrylate, and/or urethane dimethacrylate (UDMA).

In some embodiments, a compound having at least two free radically polymerizable ethylenically unsaturated groups may be a multifunctional oligomer, such as, for example, those derived from epoxy and/or polyurethane backbones. Examples of such compounds include, but are not limited to, aromatic and aliphatic di- and tri-functional polyether urethane (meth)acrylates, aromatic and aliphatic di- and tri-functional polyester urethane (meth)acrylates, other multifunctional aromatic and aliphatic urethane (meth)acrylates, and/or the like.

In some embodiments, a compound having at least two free radically polymerizable ethylenically unsaturated groups may be an end-functionalized oligomer or polymer, the backbones of which are hydrophobic, flexible and liquid at ambient temperature. Polybutadiene and polybutadiene-acrylonitrile backbones, due to their low glass transition temperature (Tg), may improve the toughness of the cured adhesive and may impart outstanding water resistance due to the hydrophobic nature of the backbone. Examples of vinyl-end-functionalized polybutadiene and polybutadiene-acrylonitrile include, but are not limited to, those that are commercially available from CVC Thermoset Specialties, Moorestown, N.J., under the designation of Hypro™ Reactive Liquid Polymers, for instance, Hypro™ VTB (methacrylate-terminated polybutadiene) and Hypro™ VTBN (methacrylate-terminated polybutadiene-acrylonitrile). Suitable examples include, but are not limited to, Hypro™ 2000X168 VTB, Hypro™ 1300X33 VTBNX and/or Hypro™ 1300X43 VTBNX. In some embodiments, the compound having at least two free radically polymerizable ethylenically unsaturated groups is Hypro™ 2000X168 VTB.

In some embodiments, a compound having at least two free radically polymerizable ethylenically unsaturated groups and/or free radical polymerization crosslinker may be present in an amount of up to about 20 percent by weight, based on the total weight of the Part B composition, such as, for example, about 1% to about 15% or about 2% to about 10% by weight, based on the total weight of the Part B composition. In some embodiments, the adhesive composition may comprise a compound having at least two free radically polymerizable ethylenically unsaturated groups and/or a free radical polymerization crosslinker in an amount of about 1%, 2%, 3%, 4%, 5%, 6%, 7%, 8%, 9%, 10%, 11%, 12%, 13%, 14%, 15%, 16%, 17%, 18%, 19%, or 20% by weight, based on the total weight of the Part B composition.

In some embodiments, an adhesive composition of the present invention may optionally comprise one or more additive(s). One or more additives may be present in Part A and/or Part B of the present invention. One additive may be an elastomeric material, which may be for improving the flexibility, elasticity, and/or fracture toughness of the cured adhesive. In some embodiments, an elastomeric material may be present in an adhesive composition of the present invention in an amount of about 1% to about 40% by weight, based on the total weight of the adhesive composition, such as, for example, about 5% to about 25%, about 10% to about 15%, or about 15% to about 35% by weight, based on the total weight of the adhesive composition. In some embodiments, the adhesive composition may comprise an elastomeric material in an amount of about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, or 40% by weight, based on the total weight of the adhesive composition.

Examples of elastomeric materials include, but are not limited to, elastomeric di- and tri-block copolymers of styrene and/or butadiene, for example, the A-B-A tri-block copolymers such as styrene-butadiene-styrene (SBS) and A-B di-block copolymers such as styrene-butadiene. These elastomeric materials include, but are not limited to, those that are available from Kraton® Polymers USA in Houston, Tex. under the designation of Kraton® Polymers USA D. Examples include D-1101, D-1102, D-1118, D-1133, D-1152, D-1153, D-1155 and/or D-1157. In some embodiments, a SBS copolymer Kraton® Polymers USA D-1157 is employed in an adhesive composition of the present invention.

Further examples of elastomeric materials include, but are not limited to, acrylonitrile-butadiene-styrene (ABS) copolymers. Some examples of ABS copolymers with higher rubber contents include, but are not limited to, those that are commercially available from Chemtura Corp. under the designation Blendex® such as Blendex® 338, and from Grand Pacific Petrochemical, Taiwan, under the designation P60R. In some embodiments, an adhesive composition of the present invention may comprise a modified ABS copolymer, such as, for example, the modified ABS copolymer under the designation of MABS TR558A manufactured by LG Chem, South Korea.

In some embodiments, elastomeric materials may be added to an adhesive composition of the present invention to improve the fracture toughness of the cured adhesive. Any number of additional soluble or dispersible elastomeric polymers and/or copolymers may be incorporated into an adhesive composition of the present invention without limitation. These include, but are not limited to, polychloroprene elastomers, chlorosulfonated polyethylene, epichlorohydrin elastomers, styrene butadiene and/or styrene isoprene elastomers, nitrile elastomers, poly(meth)acrylate elastomers, and/or polyurethane elastomers.

An adhesive composition of the present invention (e.g., a two-part curable adhesive composition of the present invention) may comprise an inhibitor to prevent premature polymerization and/or to provide a desirable working time of the adhesive. Example inhibitors include, but are not limited to, phenols such as butylated hydroxyl toluene (BHT), 2,6-di-tert-butyl-4-(dimethylaminomethyl)phenol, quinones (benzoquinone), hydroquinones (hydroquinone monomethyl ether, MEHQ), and/or the like. In some embodiments, an inhibitor may be present in amount of up to about 5 percent by weight, based on the total weight of the adhesive composition, such as, for example in a range of about 0.01% to about 3% or about 0.1% to about 2% by weight, based on the total weight of the adhesive composition. In some embodiments, the adhesive composition may comprise an inhibitor in an amount of about 0.01%, 0.05%, 0.1%, 0.5%, 1%, 2%, 3%, 4%, or 5% by weight, based on the total weight of the adhesive composition.

An adhesive composition of the present invention may comprise a stabilizer such as, for example, an antioxidant, anti-sag additive, UV stabilizer and/or moisture scavenger. In some embodiments, the adhesive composition may comprise molecular sieves (5A) as a drying agent, which may be useful to improve the shelf stability when a polyisocyanate is present in the composition.

Other optional additives that may be present in an adhesive composition of the present invention include, but are not limited to, non-reactive fillers such as, e.g., finely divided silica, fumed silica, carbon black, clay, bentonite, glass beads, etc. A filler may be present in an adhesive composition in an amount of about 0% to about 20% by weight, based on the total weight of the adhesive composition, such as, for example, about 0.1% to about 10% by weight based on the total weight of the adhesive composition. In some embodiments, the adhesive composition may comprise a filler in an amount of about 0.1%, 0.25%, 0.5%, 0.75%, 1%, 2%, 3%, 4%, 5%, 6%, 7%, 8%, 9%, 10%, 11%, 12%, 13%, 14%, 15%, 16%, 17%, 18%, 19%, or 20% by weight, based on the total weight of the adhesive composition.

The ratio of Part A composition to Part B composition may be anywhere from about 1:4 to about 1:20 (Part A:Part B). The ratio may be a volume ratio (i.e., the volume of Part A to the volume of Part B). In some embodiments, the volume ratio of Part A to Part B may be about 1:4. In some embodiments, the volume ratio of Part A to Part B may be 1:10. In some embodiments, Part A and Part B of an adhesive composition of the present invention are combined and/or mixed (e.g., blended, shaken, stirred, etc.) in the volume ratio.

In some embodiments, an adhesive composition of the present invention may be a combination and/or admixture of at least two parts and/or compositions. Thus, an adhesive composition of the present invention may be a combination and/or admixture of a first composition and a second composition. In some embodiments, the first composition comprises a Part A initiator composition of the present invention and the second composition comprises a Part B activator composition of the present invention.

In some embodiments, the first composition and/or Part A composition may comprise an initiator in an amount of up to about 55% by weight of the first and/or Part A composition and an amine terminated liquid polymer in an amount of up to about 70% by weight of the first and/or Part A composition. In some embodiments, the first composition and/or Part A composition may comprise an initiator in an amount of about 30% to about 50% by weight of the first and/or Part A composition and an amine terminated liquid polymer in an amount of about 45% to about 70% by weight of the first and/or Part A composition. The first and/or Part A composition may comprise one or more additives, such as, for example, an inhibitor and/or filler. In some embodiments, one or more additives (e.g., an inhibitor and/or filler) may each optionally be present in the first and/or Part A composition in an amount of up to about 10% by weight of the first and/or Part A composition.

In some embodiments, the second composition and/or Part B composition may comprise an isocyanate (e.g., a polyisocyanate) in an amount of up to about 20% by weight of the second and/or Part B composition, a free radically polymerizable monomer in an amount of up to about 70% by weight of the second and/or Part B composition, and a compound having at least two free radically polymerizable ethylenically unsaturated groups in an amount of up to about 20% by weight of the second and/or Part B composition. In some embodiments, the second composition and/or Part B composition may comprise an isocyanate in an amount of about 1% to about 15% by weight of the second and/or Part B composition, a free radically polymerizable monomer in an amount of about 45% to about 70% by weight of the second and/or Part B composition, and a compound having at least two free radically polymerizable ethylenically unsaturated groups in an amount of about 1% to about 15% by weight of the second and/or Part B composition. The second and/or Part B composition may comprise one or more additives, such as, for example, an elastomeric material, inhibitor, and/or drying agent. In some embodiments, an inhibitor and/or drying agent each may optionally be present in the second and/or Part B composition in an amount of up to about 10% by weight of the second and/or Part B composition. In some embodiments, an elastomeric material may be present in the second and/or Part B composition in an amount of up to about 40% by weight of the second and/or Part B composition, such as, for example, about 1% to about 40%, about 25% to about 40%, or about 5% to about 20% by weight of the second and/or Part B composition.

An adhesive composition of the present invention may have any suitable reactivity time. "Reactivity time" as used herein refers to the time to reach the maximum temperature of an exothermic reaction from start of combination (e.g., mixing) of a certain amount of an adhesive composition. In some embodiments, an adhesive composition of the present invention may have a reactivity time in a range of about 1 minute to about 15 minutes, such as, for example, about 2 to about 10 minutes or about 2 to about 5 minutes. In some embodiments, an adhesive composition of the present invention may have a reactivity time of about 1, 2, 3, 4, 5, 6, 7, 8, 9, 10, 11, 12, 13, 14, or 15 minutes. In some embodiments, reactivity time is determined and/or measured by combining (e.g., mixing) a total of three grams of the adhesive composition. In some embodiments, reactivity time is determined and/or measured based on an adhesive composition in which the combination of a Part A composition and Part B composition totals three grams. Reactivity time may be determined and/or measured at any suitable temperature, such as, for example, at a temperature in a range of about 65° F. to about 75° F. and/or at about room temperature.

In some embodiments, an adhesive composition of the present invention may have a peak exothermic temperature in a range of about 27° C. to about 32° C., such as, for example, about 28° C. to about 30° C. In some embodiments, an adhesive composition of the present invention may have a peak exothermic temperature of about 27, 28, 29, 30, 31, or 32° C. The peak exothermic temperature may be measured immediately when a certain amount (e.g., a total of three grams) of an adhesive composition is combined. For example, in some embodiments, the peak exothermic temperature may be determined by measuring the temperature starting at the time when Part A and Part B of an adhesive composition of the present invention are combined (e.g., mixed).

In some embodiments, an adhesive composition of the present invention may have a lap shear strength at room temperature in a range of about 1000 psi to about 1700 psi, such as, for example, about 1200 psi to about 1500 psi or about 1100 psi to about 1450 psi. In some embodiments, an adhesive composition of the present invention may have a lap shear strength at room temperature of about 1000, 1050, 1100, 1150, 1200, 1250, 1300, 1350, 1400, 1450, 1500, 1550, 1600, 1650, or 1700 psi. In some embodiments, lap shear strength may be measured at room temperature after the adhesive composition is allowed to set and/or cure for a given number of days (e.g., about 1, 2, 3, 4, 5, or more days) at a given temperature (e.g., about 65° F. to about 75° F.), such as, for example, after the adhesive composition is allowed to set and/or cure for about four days at room temperature. In some embodiments, lap shear strength at room temperature may be determined in accordance with ASTM D905: Standard Test Method for Strength Properties of Adhesive Bonds in Shear by Compression Loading and/or in accordance with a method described herein.

In some embodiments, an adhesive composition of the present invention may have a lap shear strength at 80° C. in a range of about 500 psi to about 1200 psi, such as, for example, about 600 psi to about 1000 psi or about 700 psi to about 900 psi. In some embodiments, an adhesive composition of the present invention may have a lap shear strength at 80° C. of about 500, 550, 600, 650, 700, 750, 800, 850, 900, 950, 1000, 1050, 1100, 1150, or 1200 psi. In some embodiments, lap shear strength may be measured at 80° C. after the adhesive composition is allowed to set and/or cure for a given number of days (e.g., about 1, 2, 3, 4, 5, or more days) at a given temperature (e.g., about 65° F. to about 75° F.), such as, for example, after the adhesive composition is allowed to set and/or cure for about four days at room temperature. In some embodiments, lap shear strength at 80° C. may be determined in accordance with ASTM D905: Standard Test Method for Strength Properties of Adhesive Bonds in Shear by Compression Loading and/or in accordance with a method described herein.

In some embodiments, an adhesive composition of the present invention may be stable for at least 6 months (e.g., about 6, 7, 8, 9, 10, 11, or 12 months or more) under normal storage conditions such as, for example, normal storage conditions at ambient temperature. In general, ambient temperature is in a range of about 60 to about 80 degrees Fahrenheit or about 16 to about 27 degrees Celsius. The adhesive composition may be stored in a sealed container and stability may be determined by confirming that the adhesive composition in the sealed container does not become significantly thicker (e.g., an increase in thickness by 30% or more) and/or form a gel from premature polymerization. In some embodiments, stability may be determined by confirming that the resulting bonding strength for the adhesive composition after a given period of time (e.g., 6 months) stored under normal storage conditions does not deteriorate during the shelf life of the adhesive.

In some embodiments, an adhesive composition of the present invention may have a time-to-failure for plastic pipe joints prepared with the adhesive composition under a constant hydraulic pressure of at least 15 hours, such as, for example, at least about 16, 17, 18, 19, 20, 21, 22, 23, 24, 25, 26, 27, 28, 29, 30, 31, 32, 33, 34, 35, 36, 37, 38, 39, 40 hours or more. In some embodiments, an adhesive composition of the present invention may have a time-to-failure for plastic pipe joints prepared with the adhesive composition under a long term hydrostatic sustained pressure strength test of at least about 1000 hours, such as, for example, at least about 1050, 1200, 1250, 1300, 1350, 1400, 1450, 1500, 1600, 1700, 1800, 1900, 2000, 2250, 2500, 2750, 3000, 3250, 3500, 3750, 4000 hours or more. In some embodiments, the time-to-failure may be measured under constant hydrostatic pressure, in accordance with ASTM D1598: Standard Test Method for Time-to-Failure of Plastic Pipe under Constant Internal Pressure, and/or in accordance with a method described herein.

In some embodiments, an adhesive composition of the present invention may have an increased resistance to heat and/or moisture and/or water. For example, an adhesive composition of the present invention may have a heat, moisture, and/or water resistance that is increased by at least about 5%, 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, or more compared to the heat, moisture, and/or water resistance of a known and/or commercial adhesive composition, such as, for example, a commercial adhesive composition currently used for polyolefin substrates.

In some embodiments, an adhesive composition of the present invention may have an increased strength. For example, an adhesive composition of the present invention may have a strength, such as, for example a strength after application and/or curing to a pipe (e.g., a PP-R pipe), that is increased by at least about 5%, 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, or more compared to the strength of a known and/or commercial adhesive composition, such as, for example, a commercial adhesive composition currently used for polyolefin substrates.

In some embodiments, an adhesive composition of the present invention may have an increased time-to-failure for plastic pipe joints prepared with the adhesive composition under constant hydraulic pressure. For example, plastic pipe joints (e.g., PP-R pipe joints) prepared with an adhesive composition of the present invention may have a time-to-failure that is increased by at least about 5%, 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, 350%, 400%, 450%, 500%, 550%, 600%, or more compared to the time-to-failure for plastic pipe joints prepared with a known and/or commercial adhesive composition, such as, for example, a commercial adhesive composition currently used for polyolefin substrates. The time-to-failure may be measured under constant hydrostatic pressure, in accordance with ASTM D1598: Standard Test Method for Time-to-Failure of Plastic Pipe under Constant Internal Pressure, and/or in accordance with a method described herein.

In some embodiments, an adhesive composition of the present invention may have an increased elasticity, toughness, and/or flexibility. For example, an adhesive composition of the present invention may have an elasticity, toughness, and/or flexibility, such as, for example an elasticity, toughness, and/or flexibility after application and/or curing to a pipe (e.g., a PP-R pipe), that is increased by at least about 5%, 10%, 15%, 20%, 25%, 30%, 35%, 40%, 45%, 50%, 55%, 60%, 65%, 70%, 75%, 80%, 85%, 90%, 95%, 100%, 150%, 200%, 250%, 300%, or more compared to the elasticity, toughness, and/or flexibility of a known and/or commercial adhesive composition, such as, for example, a commercial adhesive composition currently used for polyolefin substrates.

An adhesive composition of the present invention comprising at least two parts and/or compositions may be combined and/or admixed together using any means known to those of skill in the art. In some embodiments, at least two parts and/or compositions of an adhesive composition of the present invention may be mixed, stirred, shaken, blended, and/or the like together.

Provided according to some aspects of the present invention are methods of using an adhesive composition of the present invention. In some embodiments, an adhesive composition of the present invention may be used to join and/or bond two objects together. For example, in some embodiments, a method of joining and/or bonding a first object and second object may be provided, the method comprising applying an adhesive composition of the present invention to at least one surface of the first object and/or second object and curing the adhesive composition to thereby join and/or bond the first object and second object together. In some embodiments, the adhesive composition comprises a Part A initiator composition of the present invention and a Part B activator composition of the present invention.

In some embodiments, the adhesive composition is combined (e.g., mixed) prior to applying the adhesive composition to the at least one surface of the first object and/or second object. In some embodiments, the adhesive composition is a two-part curable adhesive composition comprising a Part A initiator composition and a Part B activator composition, and Part A and Part B may be combined together to form the adhesive composition prior to applying the adhesive composition to the at least one surface of the first object and/or second object.

In some embodiments, the first and/or second object may comprise a polyolefin. In some embodiments, the first and/or second object and/or a surface thereof may be a polyolefin material, such as, e.g., a low surface energy polyolefin material. In some embodiments, the first and/or second object and/or a surface thereof may comprise a polypropylene random copolymer (PP-R). In some embodiments, the first and/or second object may have a PP-R surface and/or may be a PP-R pipe.

An adhesive composition of the present invention may be applied to at least one surface of the first and/or second object using any suitable method. Examples of such methods include, but are not limited to, using a dauber, brush, swab or other suitable applicator device to apply the adhesive composition to the at least one surface of the first and/or second object. Another example method for applying the adhesive composition includes, but is not limited to, using a mixing and dispensing device, such as, e.g., those described in U.S. Pat. Nos. 5,486,024, 7,341,285, 8,276,636, 9,044, 900, and U.S. Patent Application Publication Nos. 2010/0259040 and 2013/0181436, the contents of each of which is incorporated by reference herein in its entirety, to inject the adhesive composition such that it is applied to at least one surface of the first and/or second object. For example, in injection pipe joints, an adhesive may be injected via a hole in the socket into a gap between a socket and an inserted pipe end and allowed to set after the socket and pipe end have been initially fitted together.

In some embodiments, a method of forming a pipe joint comprising a pipe and fitting may be provided, the method comprising applying an adhesive composition of the present invention to at least one surface of one of the pipe and fitting; and curing the adhesive composition to form a cured adhesive that bonds the pipe and fitting, thereby forming the pipe joint. Thus, the pipe joint may comprise a pipe, a fitting, and a cured adhesive formed from an adhesive composition of the present invention at interface and/or surface between the pipe and fitting. In some embodiments, at least one of the pipe and fitting is formed of polyolefins (e.g., PP-R).

In some embodiments, the adhesive composition is formed from a Part A initiator composition of the present invention and a Part B activator composition of the present invention. In some embodiments, the method includes combining the Part A composition and the Part B composition prior to applying the adhesive composition. In some embodiments, the Part A composition contains no free radically polymerizable monomers and comprises an organoborane-amine complex and at least one amine terminated liquid polymer. In some embodiments, the Part B composition comprises at least one polyisocyanate, at least one free radically polymerizable monomer, and at least one compound having at least two free radically polymerizable ethylenically unsaturated groups.

A further aspect of the present invention relates to a pipe joint comprising a pipe and fitting bonded together by a cured adhesive, wherein the adhesive is a cured product formed from mixing a Part A initiator composition and a Part B activator composition. The Part A initiator composition may contain no free radically polymerizable monomers and may comprise an organoborane-amine complex and at least one amine terminated liquid polymer. The Part B activator composition may comprise at least one polyisocyanate, at least one free radically polymerizable monomer, and at least one compound having at least two free radically polymerizable ethylenically unsaturated groups. In some embodiments, at least one of the pipe and fitting comprises a polyolefin (e.g., PP-R). In some embodiments, the pipe and/or fitting and/or a surface thereof is formed of a polyolefin (e.g., PP-R).

The present invention is explained in greater detail in the following non-limiting Examples.

EXAMPLES

Several specific adhesive formulations of the present invention were made as described hereinafter. Each adhesive formulation consists of two parts which were prepared by mixing the ingredients in separate containers just prior to use. The two parts (i.e., Part A Initiator and Part B Activator) were prepared as described below in the Part A Initiator and Part B Activator sections. Unless otherwise indicated, all parts and percentages are by weight.

Ingredients

The following ingredients were used in the examples provided hereinafter:
Styrene-butadiene-styrene copolymer (Kraton® D1157)—Kraton® Polymers
Methacrylate-terminated polybutadiene (Hypro™ 2000X168LC VTB)—CVC Thermoset Specialties
Amine-terminated polybutadiene (Hypro™ 2000X173 ATB)—CVC Thermoset Specialties
Hydroxyl-terminated hydrogenated polybutadiene (Krasol® HLBH-P3000)—Cray Valley Hydrocarbon Specialty Chemicals
Methylmethacrylate acrylonitrile 1,3-butadiene styrene copolymer (MABS) (TR 558A)—LG Chem, Ltd.
Methyl methacrylate (MMA)—Lucite International, Inc.
Methacrylic acid (MA)—Lucite International, Inc.
Ethyleneglycol dimethacrylate (SR206)—Sartomer, Inc.
Triethylene glycol dimethacrylate (SR205)—Sartomer, Inc.
1,6-Hexanediol dimethacrylate (SR239)—Sartomer, Inc.
Difunctional aliphatic silicone acrylate (CN9800)—Sartomer, Inc.
Polymeric Hexamethylene Diisocyanate (Desmodur® N3300A)—Bayer Material Science AG
Tri-n-butylborane methoxypropylamine complex (TnBB-MOPA)—BASF Corporation
Tri-n-butylborane diaminopropane complex (TnBB-DAP)—BASF Corporation
1,4-Naphthoquinone (1,4-NQ)—Sigma-Aldrich Corporation
4-Methoxyphenol (MEHQ)—Sigma-Aldrich Corporation
Molecular Sieves, 5A (MS5A)—Sigma-Aldrich Corporation
Fumed silica (Aerosil® 200)—Evonik Industries AG Preparation of Monomer-Polymer Solution Stock monomer-polymer solutions were prepared by dissolving the polymers in methyl methacrylate (MMA) monomer. A polymer in pellet or powder form and monomer were charged to a one gallon tin plated metal can and rolled on a roller mill for 24 to 72 hours to fully dissolve the polymer in the monomer and form a homogeneous syrup-like solution with concentrations ranging from about 20-50%. The viscosity of the final formula can be adjusted by adding additional MMA after all other formulating ingredients are added.

Part A Initiator

An amine functionalized reactive liquid polymer and stabilizer were added to a Max 100 plastic cup (160 ml) from FlackTek, Inc. The mixing cup was placed into a dual asymmetric centrifugal FlackTek SpeedMixer (DAC 150.1 FV) by Hauschild Engineering, Germany. The contents were mixed twice consecutively for one minute each at a speed of 3,000 rpm to insure that high viscosity polymer solutions and solid ingredients were fully mixed and homogeneous. Fillers were then added to the mixing cup which was mixed for one minute at a speed of 3,000 rpm forming a homogeneous paste. After the mixture was cooled down to about room temperature, the organoborane-amine complex was added into the mixing cup and mixed for one minute at a speed of 3,000 rpm.

Part B Activator

Polymer solutions, monomers, crosslinkers, stabilizers and the other components except for the reactive ingredient (acid or isocyanate) were added to a Max 100 plastic cup (160 ml). The mixing cup was placed into a dual asymmetric centrifugal FlackTek SpeedMixer (DAC 150.1 FV). The contents were mixed twice consecutively for one minute each at a speed of 3,000 rpm to insure that high viscosity polymer solutions and solid ingredients were fully mixed and homogeneous. Fillers were then added to the mixing cup which was mixed for one minute at a speed of 3,000 rpm forming a homogeneous paste. After the mixture was cooled down to about room temperature, the reactive ingredient was added into the mixing cup and mixed for one minute at a speed of 3,000 rpm.

Mixing and Application of Adhesives

Part A and Part B pastes were stored in the separate chambers of a 50 ml dual cartridge from Sulzer Mixpac Ltd, Switzerland in a 1:10 volume ratio respectively. The cartridge was then placed in a hand-held dispenser. A static mixer containing 16 mixing elements was attached to the cartridge. To apply the adhesive, Part A and Part B pastes were combined and mixed by the simultaneous extrusion through the static mixer. The mixed adhesive was directly applied onto test substrates. When Part A and Part B were mixed, a reactive ingredient in the Part B reacted with the amine functionalized reactive liquid polymer in Part A and at the same time destabilized the organoborane-amine complex liberating the free organoborane which initiated polymerization of the monomers. The mixed paste gradually increases viscosity and eventually is hardened to form a strong bond to the substrate.

Lap Shear Bond Strength

Samples of the adhesive composition were evaluated to measure the lap shear bond strength and failure mode. The adhesive compositions were dispensed onto test substrates with dimensions 2 inch×1 inch×¼ inch thick (50.8 mm×25.4 mm×6.4 mm). The surface of the substrates was cleaned with methyl ethyl ketone (MEK) and dried prior to bonding. Two pieces of polyethylene terephthalate (PETG) plastic sheet (1 inch long, 0.75 inch wide, 20 mil thick) (25.4 mm×19.1 mm×0.5 mm) were used as spacer and placed to each end of the first substrate. The mixed adhesive compositions were applied and spread near the center of the substrate to cover a 0.5 inch×1 inch (12.7 mm×25.4 mm) area. A second substrate was brought against the adhesive compositions to form an overlap adhesive joint with 0.5 inch (12.7 mm) overlap. The adhesive joint was fixed with a clamp and stored at room temperature (i.e., about 23° C.) for 4-7 days. To postcure the adhesive, the joint was further placed at 80° C. for 4-7 days. Three adhesive joints were made with each adhesive formulation at each testing temperature. The adhesive joint was tested until failure by compression loading on a universal material testing machine (United Testing System, Model STM-20) equipped with a 20,000 lb. (9072 kg) load cell at a rate of 0.05 inch (1.27 mm) per minute. The lap shear strengths are an average of three measurements and are reported in psi (pound per square inch) to the nearest whole number. The debonded adhesive joints were visually inspected to determine the failure mode.

Reactivity Time and Peak Exothermic Temperature

Reactivity time is defined as the time to reach the maximum temperature of an exothermic reaction from the start of mixing a certain amount of adhesive. A timer was started immediately when 3 grams of an adhesive composition were mixed and dispensed into a small disposable cup. A type K thermocouple connected to an Extech 421502 Digital Thermometer was then inserted into the mixed adhesive. The time elapsed in total minutes:seconds from start of mixing to the maximum-recorded temperature was recorded as reactivity time. The maximum temperature reached was recorded as peak exothermic temperature.

Wrinkles on the Cured Adhesive

The polymerization of acrylate-based adhesives is usually accompanied by significant shrinkage and the production of internal stresses. The formation of wrinkles on the cured adhesive is related to the polymerization shrinkage of adhesive. The higher the shrinkage and the stronger stresses lead to severe formation of wrinkles on the surface of the adhesive after curing as shown in FIG. 1.

Hydrostatic Sustained Pressure Strength

Time-to-failure for plastic pipe joints prepared with adhesive compositions of the present invention under constant hydraulic pressure was determined according to the procedures described in ASTM D1598: Standard Test Method for Time-to-Failure of Plastic Pipe under Constant Internal Pressure. Some test conditions were modified and specified as herein. PP-R pipe and fitting (63 mm PN20) were used to prepare a test assembly containing 2 6-inch pipes and 1 fitting. The surface of the bonded area was cleaned with methyl ethyl ketone (MEK) and dried prior to bonding. The adhesive compositions were used to form a pipe joint test assembly. The pipe joint was stored at room temperature (about 23° C.) for 4-7 days and at 80° C. for 4-7 days. The pipe joint was then conditioned for 1 hour in a water bath at the testing temperature (80° C. or 90° C.). A constant hydrostatic pressure (232 psi or 283 psi) was applied from a Digital Pipe Tester Airless Blueline Model 1675 (IPT Institute fur Prueftechnik Geraetebau GmbH & Co. KG, Germany). Any leakage or separation at the pipe joint under test causing loss of pressure shall constitute failure.

Unless otherwise indicated, all parts and percentages are by weight.

Examples 0-3

Comparative Adhesive Compositions

Comparative adhesive compositions (Examples 0-3) were prepared by combining the components (total 100 grams) as listed in Table 1 according to the methods described above in the preparation of Part A Initiator and Part B Activator sections. Part A and Part B of the adhesive composition were filled into of a 50 ml dual cartridge and mixed through a static mixer in a 1:10 volume ratio of Part A and Part B except for Example 0 which was mixed in a 1:1 volume ratio. Reactivity time and peak exothermic temperature were measured. Lap shear bond strength evaluation was made by applying each adhesive composition to a surface of the PP-R substrate to form overlap adhesive joints, which were then tested at room temperature and at 80° C. according to the test method described above. A short term pressure test on each pipe joint was performed as well. Test results are summarized in Table 1:

TABLE 1

|  | Ex. 0 | Ex. 1 | Ex. 2 | Ex. 3 |
|---|---|---|---|---|
| Part A - Initiator (WT. %) | | | | |
| Hypro ™ 2000x173 ATB | 89.94 | 58.1 | 58.8 | — |
| Krasol ® HLBH-P3000 | — | — | — | 58.1 |
| TnBB-MOPA | 10.0 | 39.6 | — | 39.6 |
| TnBB-DAP | — | — | 38.9 | — |

TABLE 1-continued

|  | Ex. 0 | Ex. 1 | Ex. 2 | Ex. 3 |
|---|---|---|---|---|
| 1,4-Naphthoquinone (1,4-NQ) | 0.06 | 0.3 | 0.3 | 0.3 |
| Aerosil ® 200 | — | 2.0 | 2.0 | 2.0 |
| Total: | 100 | 100 | 100 | 100 |
| Part B - Activator (WT. %) | | | | |
| Methyl methacrylate | 58.1 | 60.3 | 58.6 | 58.6 |
| Kraton ® D1157 block copolymer | 11.8 | 12.3 | 11.5 | 11.5 |
| MABS TR558A copolymer | 15.6 | 16.4 | 16.4 | 16.4 |
| Hypro ™ 2000x168LC VTB | 3.0 | 3.0 | 3.0 | 3.0 |
| MEHQ | 1.0 | 0.5 | 0.5 | 0.5 |
| Molecular sieves, 5A | 3.5 | 3.5 | 3.5 | 3.5 |
| Methacrylic acid | — | 4.0 | — | — |
| Desmodur ® N3300A | 7.0 | — | 6.5 | 6.5 |
| Total: | 100 | 100 | 100 | 100 |
| Reactivity Time | 56" | 57'3" | 2'59" | 3'25" |
| Peak Exothermic Temperature/3 g | 34.4° C. | 27.2° C. | 34.8° C. | 28.8° C. |
| Lap Shear Strength at RT, psi (mPa) | — | 136 (0.9) | 1311 (9.0) | 1292 (8.9) |
| Type of failure | — | AF | AF | AF |
| Lap Shear Strength at 80° C., psi (mPa) | — | 65 (0.4) | 388 (2.7) | 430 (3.0) |
| Type of failure | — | AF | AF | AF |
| Time to Failure under pressure (hr)* | — | — | — | 1 |
| Type of failure | — | — | — | Leak at bondline |

In Example 0, a trifunctional isocyanate Desmodur® N3300A in Part B was used as a crosslinker to react with the amine terminated polybutadiene Hypro™ 2000x173 ATB in Part A and as the decomplexing agent to react with the amine in the organoborane-amine complex TnBB-MOPA, liberating the free organoborane which initiates the polymerization of methyl methacrylate and Hypro™ 2000x168LC VTB crosslinker. The mixing ratio of Part A to Part B was 1:1 in volume. The weight percentage of the cross-linked polyurea in the total adhesive compositions was 50%. The reactivity time was very short only 56 seconds. The peak exothermic temperature per 3 gram adhesive was about 34° C. Although the adhesive composition gelled rapidly, the cured adhesive was very soft and weak.

In Example 1, methacrylic acid was used in the adhesive composition rather than isocyanate as the decomplexing agent to react with the amines in Part A, liberating the free organoborane which initiates the polymerization of monomers. The reactivity time was very long. The lap shear strengths at room temperature and at 80° C. were very low.

In Example 2, an organoborane diamine complex was used in the adhesive composition rather than an organoborane monoamine complex in Part A. The reactivity time was normal about 3 minutes. However, adhesive composition gelled rapidly. The peak exothermic temperature per 3 gram adhesive was about 35° C., slightly higher than normal. The lap shear strength was 1311 psi at room temperature and 388 psi at 80° C. The rapid gelling and higher peak exothermic temperature indicated that the diamine reacted with trifunctional isocyanate forming a polymer network much faster than the monoamine.

In Example 3, Krasol® HLBH-P3000, a hydroxyl-terminated polybutadiene, was used in the adhesive composition rather than Hypro™ 2000X173 ATB, an amine-terminated polybutadiene, in Part A. The reactivity time was about 3 minutes. The peak exothermic temperature per 3 gram adhesive was about 29° C. The lap shear strength was 1292 psi at room temperature and 430 psi at 80° C. However, the time to failure in the short term pressure test on the pipe joint was only 1 hour under 232 psi & at 90° C.

Examples 4-6

Adhesive Compositions

A series of adhesive compositions (Examples 4-6) were prepared by combining the components (total 100 grams) as listed in Table 2 with varying amounts (0-7% by weight) of crosslinker Hypro™ 2000x168LC VTB in Part B according to the methods described above in the preparation of Part A Initiator and Part B Activator sections. Part A and Part B of the adhesive composition were filled into of a 50 ml dual cartridge and mixed through a static mixer in a 1:10 volume ratio of Part A and Part B. Reactivity time and peak exothermic temperature were measured. Lap shear bond strength evaluation was made by applying each adhesive composition to a surface of a PP-R substrate to form overlap adhesive joints which were then tested at room temperature and at 80° C. according to the test method described above. A short term pressure test on each pipe joints were performed as well. Test results are summarized in Table 2:

TABLE 2

|  | Ex. 4 | Ex. 5 | Ex. 6 |
|---|---|---|---|
| Part A - Initiator (WT. %) | | | |
| Hypro ™ 2000x173 ATB | 58.1 | 58.1 | 58.1 |
| TnBB-MOPA | 39.6 | 39.6 | 39.6 |
| 1,4-Naphthoquinone (1,4-NQ) | 0.3 | 0.3 | 0.3 |
| Aerosil ® 200 | 2.0 | 2.0 | 2.0 |
| Total: | 100 | 100 | 100 |

TABLE 2-continued

|  | Ex. 4 | Ex. 5 | Ex. 6 |
|---|---|---|---|
| Part B - Activator (WT. %) | | | |
| Methyl methacrylate | 60.7 | 58.6 | 55.9 |
| Kraton ® D1157 block copolymer | 12.4 | 11.5 | 10.2 |
| MABS TR558A copolymer | 16.4 | 16.4 | 16.4 |
| Hypro ™ 2000x168LC VTB | 0 | 3.0 | 7.0 |
| MEHQ | 0.5 | 0.5 | 0.5 |
| Molecular sieves, 5A | 3.5 | 3.5 | 3.5 |
| Desmodur ® N3300A | 6.5 | 6.5 | 6.5 |
| Total: | 100 | 100 | 100 |
| Reactivity Time | 9'37" | 4'24" | 3'55" |
| Peak Exothermic Temperature/3 g | 29.3° C. | 28.5° C. | 28.2° C. |
| Lap Shear Strength at RT, psi (mPa) | 1254 (8.6) | 1233 (8.5) | 1457 (10) |
| Type of failure | AF | AF | AF |
| Lap Shear Strength at 80° C., psi (mPa) | 806 (5.6) | 622 (4.3) | 578 (4.0) |
| Type of failure | AF | AF | AF |
| Time to Failure under pressure (hr)* | 4 | 29 | 15 |
| Type of failure | Leak at bondline | Leak at bondline | Leak at bondline |

*Test conditions: 232 psi & 90° C. on a 63 mm PN20 PP-R pipe joint with 25 mm socket depth.

In these examples, the amount of crosslinker Hypro™ 2000x168LC VTB for the addition polymerization network in Part B varies from 0% to 7%. Without a crosslinker, Example 4 adhesive composition took slightly longer time to reach the maximum exothermic temperature. The lap shear strength was normal (1254 psi) at room temperature and was high (806 psi) at 80° C. However, the time to failure in the short term pressure test the pipe joint was 4 hours under 232 psi & at 90° C. In Example 5, an addition of 3% crosslinker did not improve the lap shear strengths, but greatly increased the time to failure (29 hours) of the PP-R pipe joint under a constant hydraulic pressure of 232 psi & at 90° C. In Example 6, when the amount of the crosslinker was increased to 7%, the lap shear strengths maintained about constant but the time to failure for the PP-R pipe joint under pressure of 232 psi & at 90° C. dropped to 15 hours. In addition, no wrinkles were observed on the surfaces of the adhesives after curing.

Examples 7-10

Adhesive Compositions

A series of adhesive compositions (Examples 7-10) were prepared by combining the components (total 100 grams) as listed in Table 3 using various crosslinkers with different molecular weights according to the methods described above in the preparation of Part A Initiator and Part B Activator sections. Part A and Part B of the adhesive composition were filled into of a 50 ml dual cartridge and mixed through a static mixer in a 1:10 volume ratio of Part A and Part B. Reactivity time and peak exothermic temperature were measured. Lap shear bond strength evaluation was made by applying each adhesive composition to a surface of a PP-R substrate to form overlap adhesive joints which were then tested at room temperature and at 80° C. according to the test method described above. A short term pressure test on each of the pipe joints was performed as well. Test results are summarized in Table 3.

TABLE 3

|  | Ex. 7 | Ex. 8 | Ex. 9 | Ex. 10 |
|---|---|---|---|---|
| Part A - Initiator (WT. %) | | | | |
| Hypro ™ 2000x173 ATB | 58.1 | 58.1 | 58.1 | 58.1 |
| TnBB-MOPA | 39.6 | 39.6 | 39.6 | 39.6 |
| 1,4-Naphthoquinone (1,4-NQ) | 0.3 | 0.3 | 0.3 | 0.3 |
| Aerosil ® 200 | 2.0 | 2.0 | 2.0 | 2.0 |
| Total: | 100 | 100 | 100 | 100 |
| Part B - Activator (WT. %) | | | | |
| Methyl methacrylate | 58.6 | 58.6 | 58.6 | 53.6 |
| Kraton ® D1157 block copolymer | 11.5 | 11.5 | 11.5 | 11.5 |
| MABS TR558A copolymer | 16.4 | 16.4 | 16.4 | 16.4 |
| Sartomer SR205 | 3.0 | — | — | — |
| Sartomer SR239 | — | 3.0 | — | — |
| Sartomer SR206 | — | — | 3.0 | — |
| Sartomer CN9800 | — | — | — | 8.0 |
| MEHQ | 0.5 | 0.5 | 0.5 | 0.5 |
| Molecular sieves, 5A | 3.5 | 3.5 | 3.5 | 3.5 |
| Desmodur ® N3300A | 6.5 | 6.5 | 6.5 | 6.5 |
| Total: | 100 | 100 | 100 | 100 |
| Reactivity Time | 2'16" | 6'14" | 8'39" | 3'31" |
| Peak Exothermic Temperature/3 g | 28.6° C. | 27.6° C. | 31.2° C. | 31.0° C. |
| Lap Shear Strength at RT, psi (mPa) | 1492 (10) | 1361 (9.4) | 1245 (8.6) | 1016 (7.0) |
| Type of failure | AF | AF | AF | AF |
| Lap Shear Strength at 80° C., psi (mPa) | 1021 (7.0) | 714 (4.9) | 617 (4.3) | 526 (3.6) |

TABLE 3-continued

|  | Ex. 7 | Ex. 8 | Ex. 9 | Ex. 10 |
|---|---|---|---|---|
| Type of failure | AF | AF | AF | AF |
| Time to Failure under pressure (hr)* | 12 | 14 | — | — |
| Type of failure | Leak at bondline | Leak at bondline | — | — |

*Test conditions: 232 psi & 90° C. on a 63 mm PN20 PP-R pipe joint with 25 mm socket depth.

In Example 7, triethylene glycol dimethacrylate (M.W. 286) (Sartomer SR205) was used as the crosslinker for the addition polymerization network. In Example 8, ethyleneglycol dimethacrylate (M.W. 198) (Sartomer SR206) was used as the crosslinker. In Example 9, 1,6-hexanediol dimethacrylate (M.W. 254) (Sartomer SR239) was used as the crosslinker. In Example 10, difunctional aliphatic silicone acrylate oligomer (Sartomer CN9800) was used as the crosslinker. The lap shear strengths of the example adhesive compositions varied from about 1000 psi to about 1500 psi at room temperature and about 500 psi to about 1000 psi at 80° C. The time to failure in the short term pressure test for the pipe joint was greater than 10 hours under 232 psi & at 90° C. In addition, no wrinkles were observed on the surfaces of the adhesives after curing.

Example 11

Long Term Pressure Test

The Example 5 adhesive composition was selected to perform a long term hydrostatic sustained pressure strength test. A 63 mm PN20 PP-R pipe and 2 different fittings with 25 mm socket depth and 37.5 mm socket depth were used to prepare the test assembly. The test was conducted under 283 psi and at 80° C. Test results are summarized in Table 4.

TABLE 4

|  | 25 mm Socket Depth | 37.5 mm Socket Depth |
|---|---|---|
| Time to Failure under pressure (hr)* | 1042 | 3373 |
| Type of failure | no failure | no failure |

*Test conditions: 283 psi & 80° C. on a 63 mm PN20 PP-R pipe joint

Example 12

Shelf Stability

The Example 5 adhesive composition was selected to perform a shelf life stability test. Part A and Part B of the adhesive composition were filled into of 50 ml dual cartridges (10:1 ratio). The filled cartridges were stored at room temperature of about 23° C. One cartridge was removed for the stability test every 2 months. Lap shear bond strength evaluation was made by applying the adhesive composition to a surface of a PP-R substrate to form overlap adhesive joints which were stored at room temperature for 7 days and then were tested at room temperature. The results, summarized in Table 5, illustrate the lap shear strength remains consistent for all testing samples indicating that an adhesive composition of the present invention is stable for at least 10 months at room temperature.

TABLE 5

|  | Storage Time at Room Temp. | | | | | | |
|---|---|---|---|---|---|---|---|
|  | Start | 2 mo. | 4 mo. | 6 mo. | 8 mo. | 10 mo. | 12 mo. |
| Reactivity Time | 10'57" | 7'11" | 11'15" | 15'18" | 13'12" | 11'21" | 9'17" |
| Peak Exothermic Temperature/3 g | 30.1° C. | 26.7° C. | 26.5° C. | 27.0° C. | 27.3° C. | 27.3° C. | 30.8° C. |
| Lap Shear Strength at RT, psi(mPa) | 1188(8.4) | 1244(8.7) | 1114(7.8) | 1159(8.1) | 1362(9.6) | 1507(10.4) | 1742(12.0) |

COMPARATIVE EXAMPLES

Three popular commercially available adhesives on the market for bonding low surface energy plastic substrates were evaluated for comparison. 3M Scotch-Weld™ Structural Adhesive DP 8005 is a 2-part acrylic adhesive (with a 10:1 mix ratio by volume). Scotch-Weld™ Adhesive DP 8005 provides high quality bonding performance on most low surface energy plastics, including polypropylene, polyethylene and thermoplastic olefins, without surface treatment. Loctite® 3035 is a high strength, faster fixturing two component acrylic adhesive system designed for bonding low energy plastics without surface pretreatment. This easy to use, 1:1 mix ratio product cures very rapidly forming tough, durable bonds. SciGrip® PPX5 Ultimate Plastic Bonder is a two-component methacrylate adhesive especially formulated for bonding low surface energy plastics such as polypropylene (PP), polyethylene (PE) and other thermoplastics. PPX5 is a 10:1 (volume) ratio adhesive offered in 50 ml dual cartridges. PPX5 bonds to low surface energy substrates without the need for surface treatment. The compressive shear strengths and time to failure under pressure were measured under similar conditions. The results, summarized in Table 6, illustrate significantly lower compressive lap shear strengths at a high temperature (80° C.) on the same PP-R substrate when compared with the results of the inventive adhesive compositions. The poor results of time-to-failure for the PP-R pipe joints prepared with the above commercially available adhesives under constant hydraulic pressure also indicates the advantage of the inventive adhesive compositions over the existing adhesives. In addition, all commercial products exhibited many wrinkles on the surface of the adhesive after curing.

TABLE 6

|  | DP8005 | 3035 | PPX5 |
|---|---|---|---|
| Mixing ratio | 10:1 | 1:1 | 10:1 |
| Reactivity Time | 1'14" | 47" | 1'8" |
| Peak Exothermic Temperature/3 g | 29.9° C. | 28.6° C. | 28.2° C. |
| Lap Shear Strength on PP-R at RT, psi (mPa) | 1321 (9.1) | 1193 (8.2) | 426 (2.9) |
| Type of failure | Adhesive | Adhesive | Adhesive |
| Lap Shear Strength on PP-R at 80° C., psi (mPa) | 255 (1.8) | 133 (0.9) | 82 (0.6) |
| Type of failure | Cohesive | Adhesive | Adhesive |
| Time to Failure under pressure (hr)* | 0 | 0 | 0 |
| Type of failure | Push-out | Push-out | Push-out |

*Test conditions: 90° C. & 232 psi on a 63 mm PN20 PP-R Pipe joint with 25 mm socket depth.

The foregoing is illustrative of the present invention, and is not to be construed as limiting thereof. The methods, compositions, and/or devices described herein may comprise any feature described herein either alone or in combination with any other feature(s) described herein. Indeed, various modifications, in addition to those shown and described herein, will become apparent to those skilled in the art from the foregoing description and accompanying drawings using no more than routine experimentation. Such modifications and equivalents are intended to fall within the scope of the appended claims. The invention is defined by the following claims, with equivalents of the claims to be included therein.

That which is claimed is:

1. An adhesive system comprising:
    a first composition comprising an organoborane-amine complex and at least one amine terminated liquid polymer; and
    a second composition comprising at least one polyisocyanate, at least one free radically polymerizable monomer, and at least one compound having at least two free radically polymerizable ethylenically unsaturated groups,
    wherein the at least one polyisocyanate is present in the second composition in an amount of about 1% to about 15% by weight of the second composition, the at least one free radically polymerizable monomer is present in the second composition in an amount of about 45% to about 70% by weight of the second composition, and the at least one compound having at least two free radically polymerizable ethylenically unsaturated groups is present in the second composition in an amount of about 1% to about 15% by weight of the second composition.

2. The adhesive system of claim 1, wherein the organoborane-amine complex is a trialkylborane-amine complex.

3. The adhesive system of claim 2, wherein the trialkylborane-amine complex is tri-n-butylborane methoxypropylamine.

4. The adhesive system of claim 1, wherein the at least one amine terminated liquid polymer has a hydrophobic flexible backbone.

5. The adhesive system of claim 1, wherein the at least one amine terminated liquid polymer is an amine-terminated polybutadiene.

6. The adhesive system of claim 1, wherein the at least one polyisocyanate is a tri-functional isocyanate.

7. The adhesive system of claim 1, wherein the at least one free radically polymerizable monomer is an acrylate monomer.

8. The adhesive system of claim 1, wherein the at least one compound having at least two free radically polymerizable ethylenically unsaturated groups is a multifunctional acrylate monomer, oligomer or polymer.

9. The adhesive system of claim 1, wherein the at least one compound having at least two free radically polymerizable ethylenically unsaturated groups is methacrylate-terminated polybutadiene.

10. The adhesive system of claim 1, wherein a reaction between the first composition and the second composition forms at least one elastomeric polymer.

11. The adhesive system of claim 10, wherein the at least one elastomeric polymer is a styrene-butadiene-styrene block copolymer, an acrylonitrile-butadiene-styrene copolymer, or a combination thereof.

12. A method of bonding a first object and second object comprising:
    combining a first composition and a second composition to form an adhesive composition, the first composition comprising an organoborane-amine complex and at least one amine terminated liquid polymer, and the second composition comprising at least one polyisocyanate, at least one free radically polymerizable monomer, and at least one compound having at least two free radically polymerizable ethylenically unsaturated groups, wherein the at least one polyisocyanate is present in the second composition in an amount of about 1% to about 15% by weight of the second composition, the at least one free radically polymerizable monomer is present in the second composition in an amount of about 45% to about 70% by weight of the second composition, and the at least one compound having at least two free radically polymerizable ethylenically unsaturated groups is present in the second composition in an amount of about 1% to about 15% by weight of the second composition;
    applying the adhesive composition to at least one surface of the first object and/or the second object; and
    curing the adhesive composition to bond the first object and second object together.

13. The method of claim 12, wherein at least one of the first object and second object comprises a polyolefin.

14. The method of claim 12, wherein at least one of the first object and second object is a polypropylene random copolymer (PP-R) pipe.

* * * * *